US010198497B2

(12) United States Patent
Gangavaram et al.

(10) Patent No.: US 10,198,497 B2
(45) Date of Patent: Feb. 5, 2019

(54) SEARCH TERM CLUSTERING

(71) Applicant: [24]7.AI, INC., San Jose, CA (US)

(72) Inventors: Viswanath Gangavaram, Bangalore (IN); Darshan Hedge, Bangalore (IN)

(73) Assignee: [24]7.AI, INC., San Jose, CA (US)

(*) Notice: Subject to any disclaimer, the term of this patent is extended or adjusted under 35 U.S.C. 154(b) by 519 days.

(21) Appl. No.: 14/300,093

(22) Filed: Jun. 9, 2014

(65) Prior Publication Data
US 2014/0365494 A1 Dec. 11, 2014

Related U.S. Application Data

(60) Provisional application No. 61/833,806, filed on Jun. 11, 2013.

(51) Int. Cl.
*G06F 7/00* (2006.01)
*G06F 17/30* (2006.01)

(52) U.S. Cl.
CPC .. *G06F 17/30598* (2013.01); *G06F 17/30424* (2013.01)

(58) Field of Classification Search
CPC ............ G06F 17/30598; G06F 17/30424
See application file for complete search history.

(56) References Cited

U.S. PATENT DOCUMENTS

| | | | |
|---|---|---|---|
| 6,173,261 B1 | 1/2001 | Arai et al. | |
| 6,714,975 B1* | 3/2004 | Aggarwal | G06Q 30/02 705/14.43 |
| 2003/0212669 A1 | 11/2003 | Dedhia et al. | |
| 2006/0184558 A1 | 8/2006 | Martin et al. | |
| 2006/0224554 A1* | 10/2006 | Bailey | G06F 17/30864 |
| 2008/0243480 A1* | 10/2008 | Bartz | G06F 17/2785 704/9 |
| 2008/0256057 A1 | 10/2008 | Riise et al. | |
| 2009/0292685 A1 | 11/2009 | Liu et al. | |
| 2010/0161601 A1 | 6/2010 | Gruber | |
| 2013/0132392 A1 | 5/2013 | Kenedy et al. | |

* cited by examiner

*Primary Examiner* — Usmaan Saeed
(74) *Attorney, Agent, or Firm* — Perkins Coie LLP

(57) ABSTRACT

When conducting the same or similar search, different users can use different search terms and phrases, resulting in an increase in the quantity of unique search terms and phrases. The intent of the various search terms and phrases is determined based on clustering of the terms and phrases of the various users. User search terms bare clustered using semantic and syntactic distances. Thus, the search engine receives a search query from a user and computes a similarity between and among user search terms. The computation uses syntactic techniques to analyze lexical aspects of linguistic terms, and semantic techniques to consider activity of the user in the particular field of interest. A similarity metric is used to determine the similarity between two search terms by computing their syntactic and semantic distances. A clustering technique is then used to cluster search terms based on their pair-wise distance.

19 Claims, 6 Drawing Sheets

SEARCH TERM CLUSTERING

CROSS REFERENCE TO RELATED APPLICATIONS

This application claims priority to U.S. provisional patent application Ser. No. 61/833,806, filed Jun. 11, 2013, which application is incorporated herein in its entirety by this reference thereto.

FIELD

The invention relates to performing searches on the Web using search terms. More particularly, the invention relates to clustering search terms using syntactic and semantic distances.

BACKGROUND

Users of the World Wide Web are familiar with the various available search engines that can be used for locating content. Search engines are provided by a number of entities and may be stand-alone search engines for performing searches across one or more websites, or embedded in websites for performing a search in content present in the website where the search engine is embedded.

While searching for content, users generally enter a search term to express the intent of their search, for example when they are looking for a specific product on a website, looking for a specific product across multiple websites, and so on. This search term may be a single word, a string of words, and so on.

The search terms play a vital role in providing an intuitive consumer experience. However, different users provide different search terms, and these terms may show a fat-tail distribution, i.e. a probability distribution that has the property that it exhibits large skewness or kurtosis. For example, there may be too many unique search terms provided by different users to achieve the same set of intents for these users where their intents are similar. Thus, it becomes challenging to predict and/or suggest search terms to a user.

SUMMARY

Embodiments of the invention cluster Web search terms using syntactic and semantic distances. Users searching for product and service information, purchasing assistance, customer support, and so on, conduct their Web searches using search engines. The search engines can be standalone, general-purpose engines, such as Chrome, Firefox, Opera, Safari, Internet Explorer, etc., or they can be part of, or embedded in, the one or more websites with which the users interact.

The users express the intent of their searches by the search terms and phrases they choose. For example, search terms and phrases can be used to seek specific goods and services, an owner's manual, reference information, and so on. When conducting the same or similar search, different users can use different search terms and phrases, resulting in an increase in the quantity of unique search terms and phrases. In embodiments of the invention, the intent of the various search terms and phrases is determined based on clustering of the terms and phrases of the various users.

Users search one or more websites to locate specific information about goods and services, to seek customer support, to obtain purchase information, and so on. The users pose queries to search engines by using search terms and phrases. Embodiments of the invention cluster the user search terms by using semantic and syntactic distances. Thus, the search engine receives a search query from user and computes a similarity between and among user search terms. The computation uses syntactic techniques to analyze lexical aspects of linguistic terms, and semantic techniques to consider activity of the user, e.g. the user's Web journey, in the particular field of interest.

In embodiments of the invention, a similarity metric is used to determine the similarity between two search terms by computing their syntactic and semantic distances. A clustering technique is then used to cluster search terms based on their pair-wise distance.

DETAILED DESCRIPTION

Figure 1:
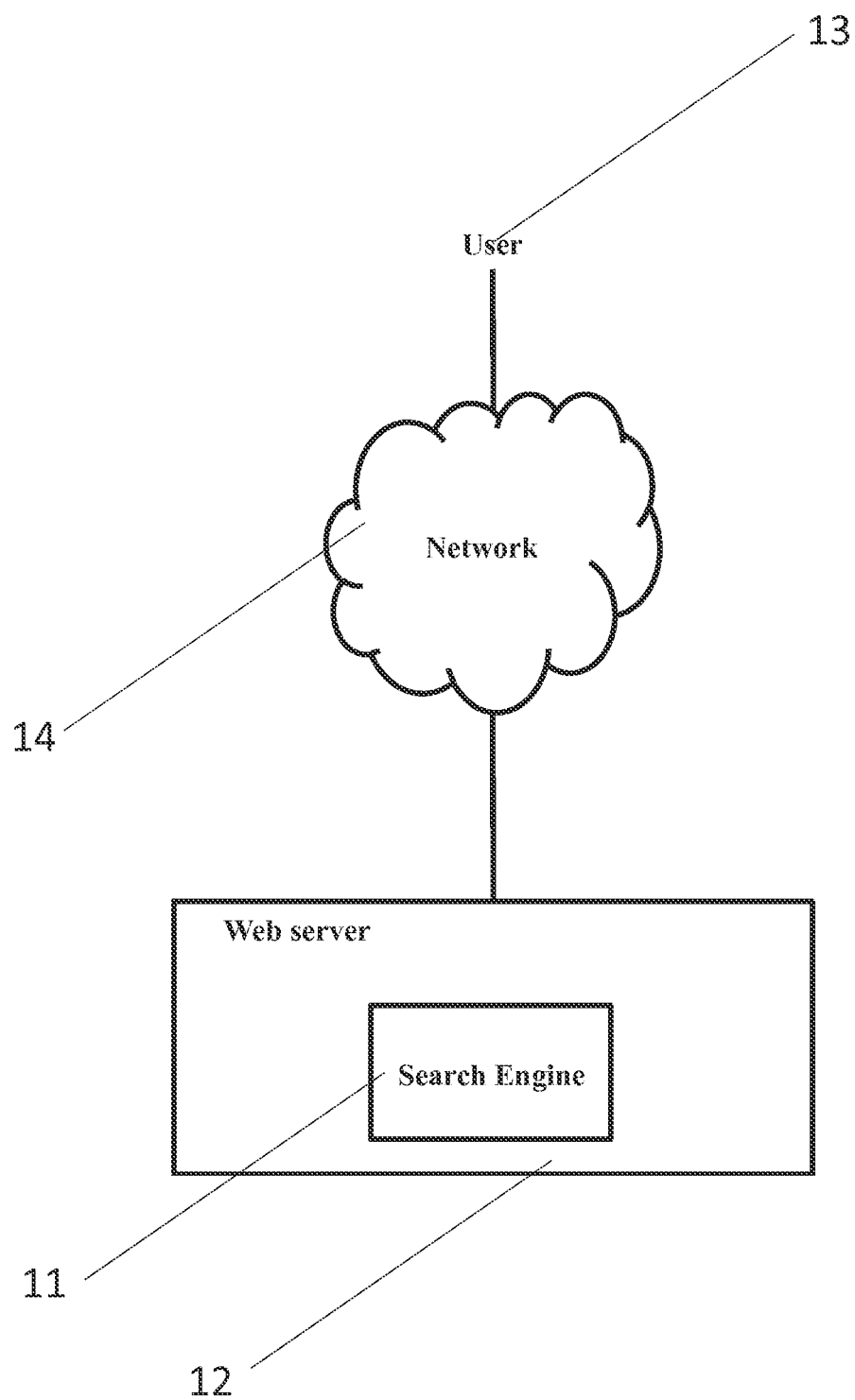
FIG. 1 is a block schematic diagram showing an architecture with which a user performs a search according to the invention.

Embodiments of the invention cluster Web search terms using syntactic and semantic distances. Users searching for product and service information, purchasing assistance, customer support, and so on, conduct their Web searches using search engines. The search engines can be standalone, general-purpose engines, such as Chrome, Firefox, Opera, Safari, Internet Explorer, etc., or they can be part of, or embedded in, the one or more websites with which the users interact.

The users express the intent of their searches by the search terms and phrases they choose. For example, search terms and phrases can be used to seek specific goods and services, an owner's manual, reference information, and so on. When conducting the same or similar search, different users can use different search terms and phrases, resulting in an increase in the quantity of unique search terms and phrases. In embodiments of the invention, the intent of the various search terms and phrases is determined based on clustering of the terms and phrases of the various users.

Users search one or more websites to locate specific information about goods and services, to seek customer support, to obtain purchase information, and so on. The users pose queries to search engines by using search terms and phrases. Embodiments of the invention cluster the user search terms by using semantic and syntactic distances. Thus, the search engine receives a search query from a user and computes a similarity between and among user search terms. The computation uses syntactic techniques to analyze lexical aspects of linguistic terms, and semantic techniques to consider activity of the user, e.g. the user's Web journey, in the particular field of interest. For example, where a user issues a search term on external search engine and lands on a customer website, customer's search term is examined, a determination is made regarding cluster to which the search term belongs, and that particular cluster identity is used as a predictor in a machine learning model.

In embodiments of the invention, a similarity metric is used to determine the similarity between two search terms by computing their syntactic and semantic distances. A clustering technique is then used to cluster search terms based on their pair-wise distance. Thus, embodiments of the invention perform clustering to group the search terms based on the intents expressed by the search terms.

Once the search terms are clustered, all of the search terms in a given cluster are identified by a one particular identifier, e.g. search_term_1, or a search term is picked randomly as an identifier of that particular cluster. The clustered search terms are used as one of the predictors in a machine learning models such as a purchase propensity model or a intent predict model. For example, where a user issues a search term on external search engine and lands on a customer website, the customer's search term is used to determine the cluster to which search term belongs. That particular cluster is then used as an identity for a predictor in a machine learning model.

Cluster analysis or clustering is the task of grouping a set of objects in such a way that objects in the same group, called a cluster, are more similar in some sense or another to each other than to those in other groups or clusters. Cluster analysis itself is not one specific algorithm, but the general task to be solved. It can be achieved by various algorithms that differ significantly in their notion of what constitutes a cluster and how to efficiently find them. Clustering can therefore be formulated as a multi-objective optimization problem. The appropriate clustering algorithm and parameter settings, including values such as the distance function to use, a density threshold, or the number of expected clusters, depend on the individual data set and intended use of the results. Cluster analysis as such is not an automatic task, but an iterative process of knowledge discovery or interactive multi-objective optimization that involves trial and failure. It is often necessary to modify data preprocessing and model parameters until the result achieves the desired properties. Embodiments of the invention can use any clustering technique that takes pair-wise distance as a distance metric between two search terms, e.g. hierarchical clustering.

Syntax concerns the way in which linguistic elements, such as words, are put together to form constituents, such as phrases or clauses.

Semantic similarity or semantic relatedness is a metric defined over a set of documents or terms, where the idea of distance between them is based on the likeness of their meaning or semantic content as opposed to similarity which can be estimated regarding their syntactical representation, e.g. their string format. These are mathematical tools used to estimate the strength of the semantic relationship between units of language, concepts or instances, through a numerical description obtained according to the comparison of information formally or implicitly supporting their meaning or describing their nature.

Concretely, semantic similarity can be estimated by defining a topological similarity, by using ontologies to define the distance between terms and/or concepts. For example, a naive metric for the comparison of concepts ordered in a partially ordered set and represented as nodes of a directed acyclic graph, e.g. a taxonomy, would be the shortest-path linking the two concept nodes. Based on text analyses, semantic relatedness between units of language, e.g. words, sentences, can also be estimated using statistical means such as a vector space model to correlate words and textual contexts from a suitable text corpus.

In embodiments of the invention, syntactic measures can also be used to determine the similarity between search terms. A weighted sub-graph of a website is generated based on the similarity of search terms. The sub-graph assigns weights to Web journey choices based on the Web journeys made by other users who are conducting searches with similar terms and phrases (see, for example FIG. 3, which is discussed below).

Figure 2:
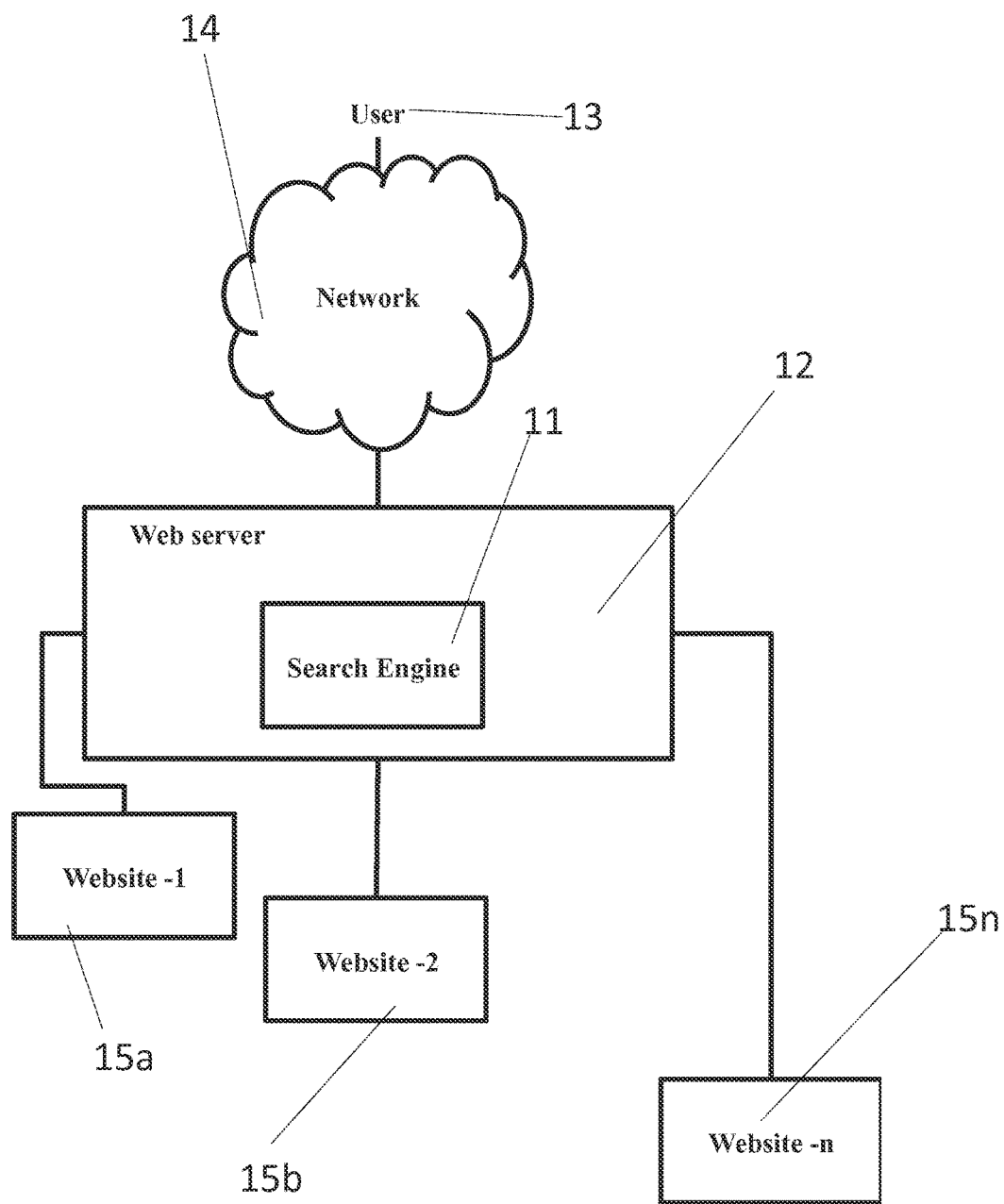
FIG. 2 is a block schematic diagram showing a further architecture with which a user performs a search according to the invention.

FIGS. 1 and 2 depict architectures that enable a user to perform a search according to the invention. Each architecture, as depicted, comprises a network 14 the enables at least one user 13 to interact with a Web server 12. The network comprises any of an IP-based (Internet Protocol) network; a telephone network, such as a PSTN (Public Switched Telephone Network) network; a mobile technology based network; and so on. The Web server may be a part of the World Wide Web (WWW) and further comprises a search engine 11.

The search engine may be integrated with the Web server to enable the user to perform a search on a website associated with the Web server, as depicted in FIG. 1. The act of performing a search using a search engine within a specific site is referred to herein as an internal search. The user may search for a product, a service, a phrase, and so on among content present on the website using the search engine.

Alternatively, the search engine enables the user to perform a search among a plurality of websites using a single search term, as depicted in FIG. 2. The act of performing a search using a search engine across a plurality of websites is referred to herein as an external search.

The term 'search' as used herein may refer to either or both of an internal search and an external search.

The search engine computes a similarity between user search terms by combining syntactic and semantic techniques. Syntactic techniques consider lexical aspects of linguistic terms and semantic techniques consider user activity on the field of interest.

A similarity metric is a metric that measures similarity or dissimilarity (distance) between two text strings for approximate string matching or comparison and in fuzzy string searching. For example the strings "Sam" and "Samuel" can be considered to be similar. A similarity metric provides a number indicating an algorithm-specific indication of similarity. The most widely known string metric is a rudimentary one called the Levenshtein distance (also known as Edit Distance). It operates between two input strings, returning a score equivalent to the number of substitutions and deletions needed to transform one input string into another. An embodiment of the invention uses a similarity metric to measure the similarity between two given search terms by putting together their syntactic and semantic distances as follows:

$$\text{Similarity}(ST1,ST2) = a^*(\text{Syntactic\_Distance}(ST1, ST2)) + b^*(\text{Semantic\_Distance}(ST1,ST2)) \quad (1)$$

and applying a suitable clustering technique with the pair-wise distance between the search terms.

Another embodiment of the invention initially applies syntactic measures to determine the similarity between two given search terms, expressed in terms of syntactic distance, as:

$$\text{Similarity}(ST1,ST2)=(\text{Syntactic\_Distance}(ST1,ST2)) \quad (2)$$

and applies a suitable clustering technique with the pair-wise distance between the search terms, represents all search terms in a single cluster with a single search term identifier, and measures the similarity between two given search terms, expressed in terms of semantic distance, as:

$$\text{Similarity}(ST1,ST2)=\text{Semantic\_Distance}((ST1,ST2)) \quad (3)$$

and then applies a suitable clustering technique with the pair-wise distance between the search terms to obtain clusters of the search terms.

Figure 3:
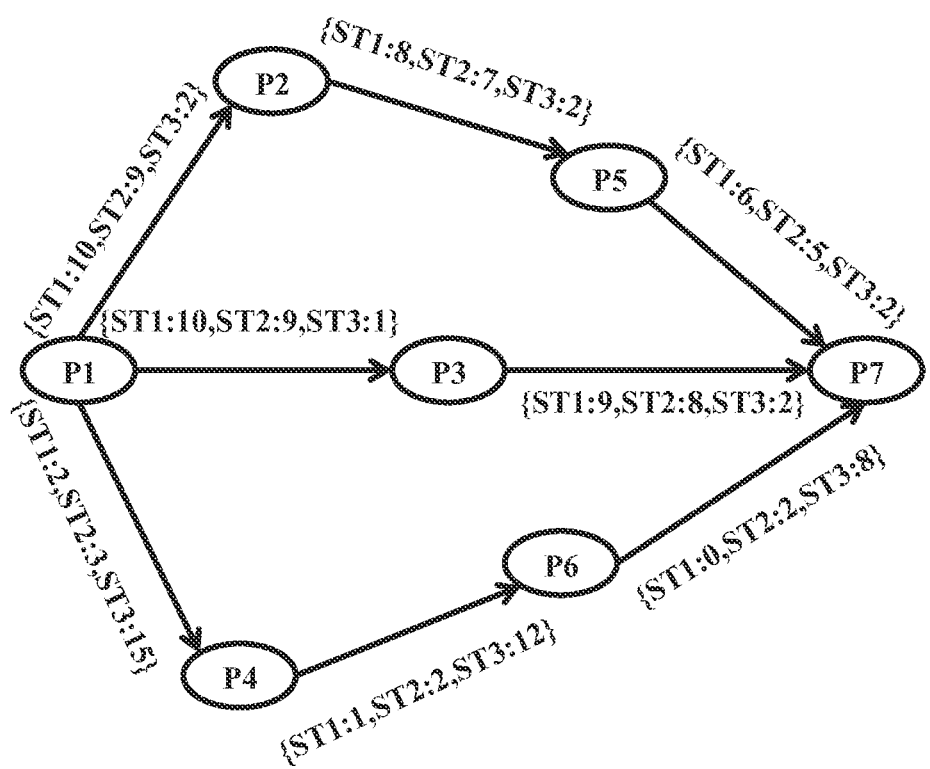
FIG. 3 is a representation of a user journey in a form of a weighted sub-graph according to the invention.

Consider a user exhibiting an intent in the form of a search term. After searching, the user lands on some given page of a website and starts browsing. Consider a representation of such a user journey in a form of a weighted sub-graph of a website, as depicted in FIG. 3. A graph is a linkage structure of nodes. In a website, each page is a node in a website graph and an edge is a hyperlink from one page to another page. Edges can have weights; if a graph has weighted edges then such graph is a weighted graph. A path is a sequence of nodes in a graph. A weighted sub-graph is a weighted graph with sub-structure of a given website. In FIG. 3, weights represent how many times all users visit from one page to another page after searching a particular search term, either internally or externally, on the website.

A typical weighted edge in a weighted sub-graph is of the form:

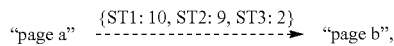

where, after searching with search term ST1, all users went ten times to "page b" from "page a," all users went to "page b" from "page a" nine times after searching with search term ST2, and all users went to "page b" from "page a" two times after searching with search term ST3.

Each search term is semantically represented by the top k nodes, paths, and edges in a particular weighted sub-graph. In embodiments of the invention, similarity between search terms is obtained using a Jacquard coefficient of the top k nodes, paths, and edges. The Jaccard similarity coefficient is a statistic used for comparing the similarity and diversity of sample sets. The Jaccard coefficient measures similarity between finite sample sets, and is defined as the size of the intersection divided by the size of the union of the sample sets.

Consider an example of calculating top k nodes, paths, and edges with the following:

Inputs: Search term ST1, Weighted sub-graph of ST1, k
1. Calculate the top k nodes for a search term ST1 as follows:
From a weighted sub-graph of search term ST1, list all the edges with their weights.
List all nodes in the above listed edges with weights. For example, if an edge from "page a" to "page b" has weight of 30 for ST1, then in that case "page a" has weight of 30 and "page b" is 30.
Sort all nodes in descending order of their weights.
Return the top k nodes from the above sorted list.
2. Calculate the top k edges for a search term ST1 as follows:
From weighted sub-graph of search term ST1, list all edges with their weights.
Sort all listed edges in a descending order of their edges.
Return the top k edges.
3. Calculate top k paths for a search term ST1 as follows:
From weighted sub-graph of search term ST1, list all edges with their weights.
In the weighted sub-graph, inverse all of the weights.
For each combination of nodes in a weighted sub-graph, calculate the shortest path.
Sort all calculated shortest paths in descending order of their total weight.
Return the top k paths.

A suitable technique, for example Levenshtein distance, is used to calculate the similarity between search terms.

In embodiments of the invention, pre-processing is performed on the search terms. Such pre-processing is a two-step process in which search term normalization is followed by finger-keying.

Search term normalization is performed as follows:
Lower case the search term.
Remove all punctuation marks except spaces.
Finger keying is performed as follows:
Take each search term and split it by space, referred to as search words.
Lemmatize each search term for each search word to obtain a list of lemmatized search words.
Sort the above list in alphabetic order.
Club the search words separated by space, referred to as finger key form, i.e. join the search words together.
Take the Levenshtein distance between finger-keys of search terms to get the pair-wise distance between search terms.

The steps as disclosed above may be performed by the search engine, the Web server, or any other suitable entity connected to the Web server using a suitable means.

Any suitable semantic technique which is user activity driven may be used to measure similarity distance between search terms.

Figure 4:
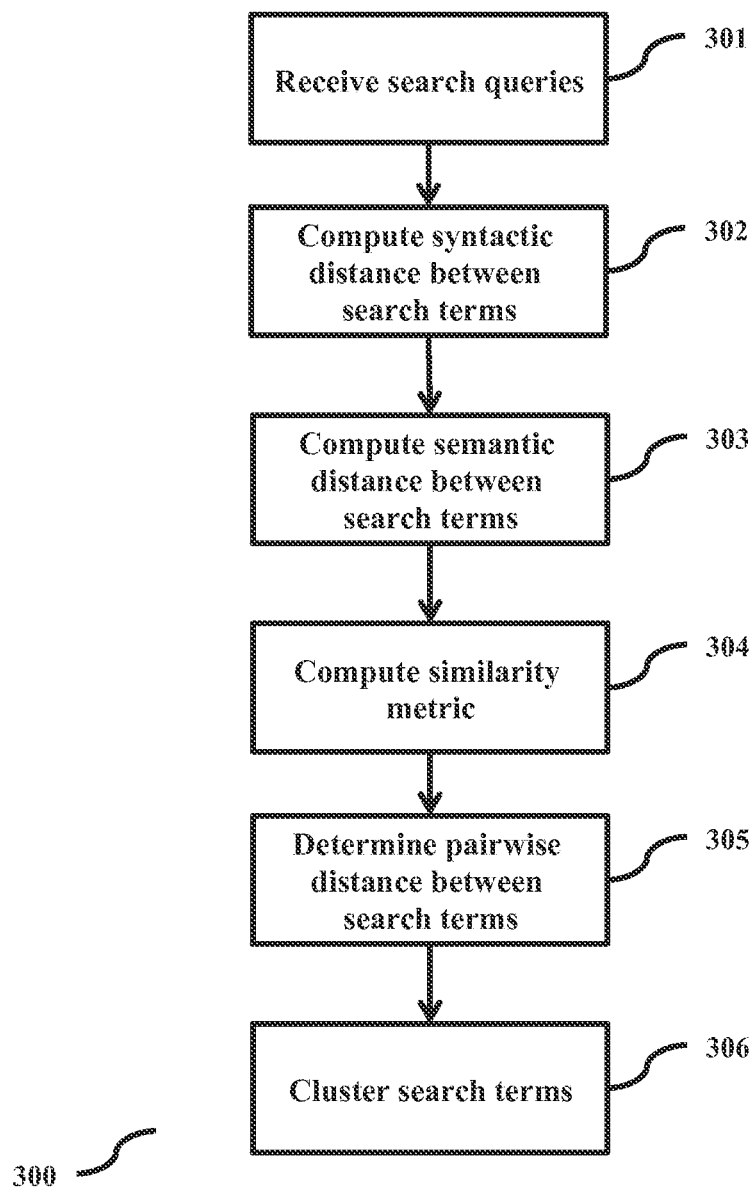
FIG. 4 is a flow diagram showing a process for grouping search terms based on the intent expressed by the search terms by clustering the search terms based on the intent expressed by the search according to the invention.

FIG. 4 is a flow diagram showing a process (300) for grouping search terms based on the intent expressed by the search terms by clustering the search terms based on the intent expressed by the search according to the invention. On receiving (301) a plurality of search terms from at least one user, the syntactic distance and the semantic distance between specific search terms are calculated (302, 303) in a pair-wise manner. In embodiments of the invention, the syntactic distance between a pair of search terms is computed based on the lexical aspects of linguistic terms, and the semantic distance between the pair of search terms is computed based on the user activities, such as search engines or within any other websites.

In embodiments of the invention, a first process for clustering search terms using syntactic and semantic distance between the search terms is used. A similarity metric between the pair of search terms is computed (304) by combining the syntactic distance and semantic distance to measure the similarities between the pair of search terms. For purposes of the discussion herein, an exemplary notation for computing the similarity between the search terms is represented as:

$$\text{Similarity}(ST1,ST2)=A*(\text{Syntactic\_Distance}(ST1,ST2))+B*(\text{Semantic\_Distance}(ST1,ST2)), \quad (4)$$

where, ST1 and ST2 represent search terms, A is a variable coefficient representing significance related to usage of syntactic distance between the ST1 and ST2, and B is a variable coefficient representing significance related to usage of semantic distance between the ST1 and ST2.

The similarity metric is used to determine (305) a pair-wise distance between the search terms. Further, the first process includes clustering (306) the search terms based on the pair-wise distance between the search terms.

The various actions shown on FIG. 4 may be performed in the order presented, in a different order, or simultaneously. Further, in some embodiments of the invention some actions shown on FIG. 4 may be omitted.

Figure 5:
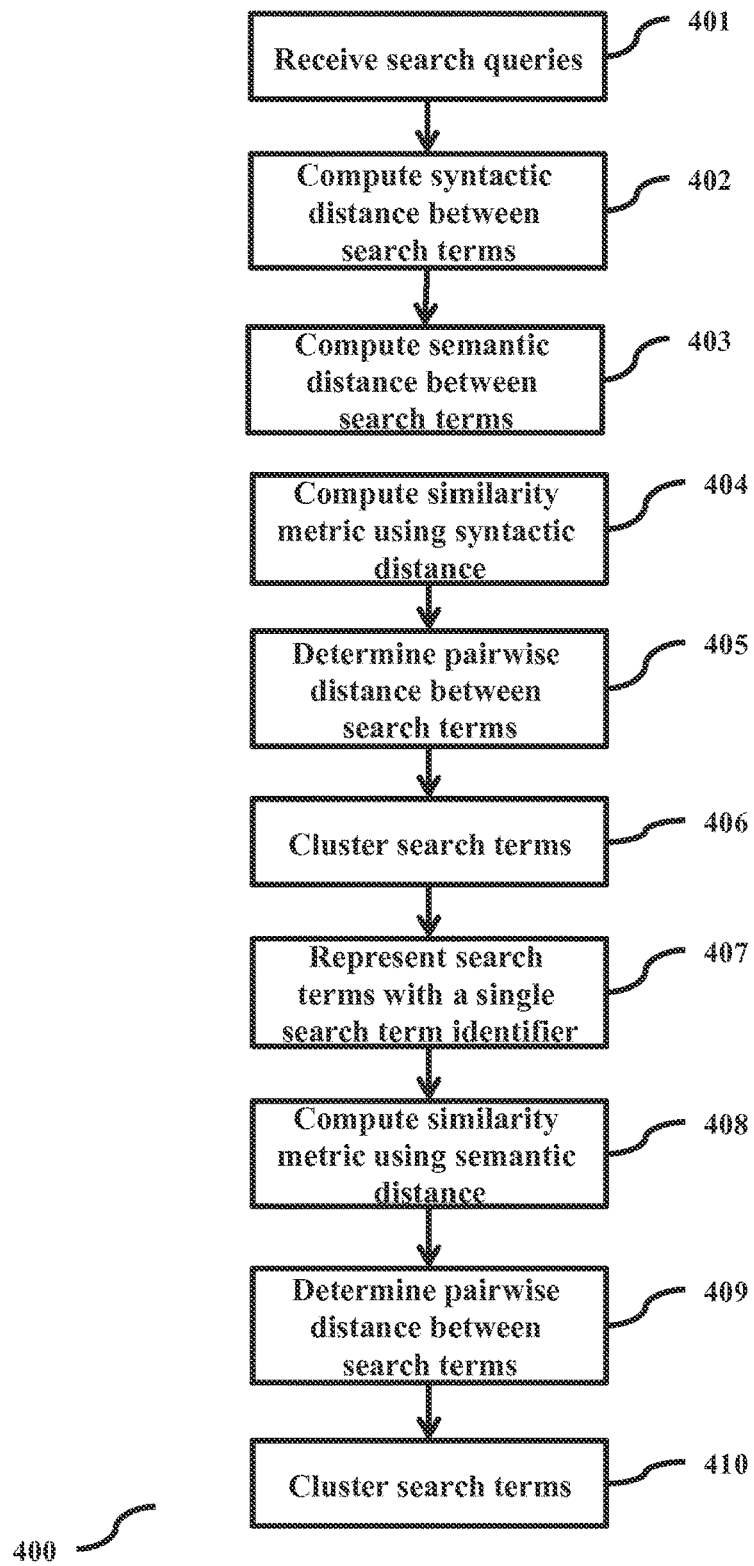
FIG. 5 is a flow diagram showing a process for grouping search terms based on the intent expressed by the search terms by clustering the search terms based on the intent expressed by the search according to the invention.

FIG. 5 is a flow diagram showing a process (400) for grouping search terms based on the intent expressed by the search terms by clustering the search terms based on the intent expressed by the search according to the invention. On receiving (401) a plurality of search terms from at least one user, the syntactic distance and the semantic distance between specific search terms are calculated (402, 403) in a pair-wise manner. In embodiments of the invention, the syntactic distance between a pair of search terms is computed based on the lexical aspects of linguistic terms, and the semantic distance between the pair of search terms is computed based on the user activities, such as search engines or within any other websites.

In embodiments of the invention, a second process for clustering search terms using syntactic and semantic distance between the search terms is used. A similarity metric using the syntactic distance between the pair of search terms is first computed (404) to measure the similarities between the search terms. For purposes of the discussion herein, an exemplary notation for computing the similarity between the search terms using syntactic distance is represented as:

$$\text{Similarity}(ST1,ST2)=\text{Syntactic\_Distance}(ST1,ST2), \quad (5)$$

where ST1 and ST2 represent search terms.

The similarity metric is used to determine (405) a pair-wise distance between the search terms. A clustering technique is used to cluster (406) the search terms, based on the pair-wise distance between the search terms, to represent (407) all of the search terms in a cluster with a single search term identifier.

The second process also computes (408) a similarity metric between the pair of search terms using the semantic distance. For purposes of the discussion herein, an exemplary notation for computing the similarity between the search terms using semantic distance is represented as:

$$\text{Similarity}(ST1,ST2)=\text{Semantic\_Distance}(ST1,ST2), \quad (6)$$

where ST1 and ST2 represent search terms.

The similarity metric are then used to determine (409) a pair-wise distance between the search terms.

The second process also applies (410) a second level of clustering, based on the pair-wise distance between the search terms, to cluster the search terms based on the user activities.

The various actions shown in FIG. 5 may be performed in the order presented, in a different order, or simultaneously. Further, in some embodiments some of the actions shown in FIG. 5 may be omitted.

Embodiments of the invention help predictive modeling frameworks to predict search terms effectively by using clusters. An embodiment of the invention clusters entities based on communities and other attributes. An embodiment of the invention effectively predicts the intent of a user by clustering search terms. Such intent can include, for example, propensity to buy and propensity to chat on a particular intent. A clustered search term is used as one of the predictors in various machine learning models. The machine learning models predict, for example, the user's intent to chat on a particular topic or to buy a product.

Computer Implementation

Figure 6:
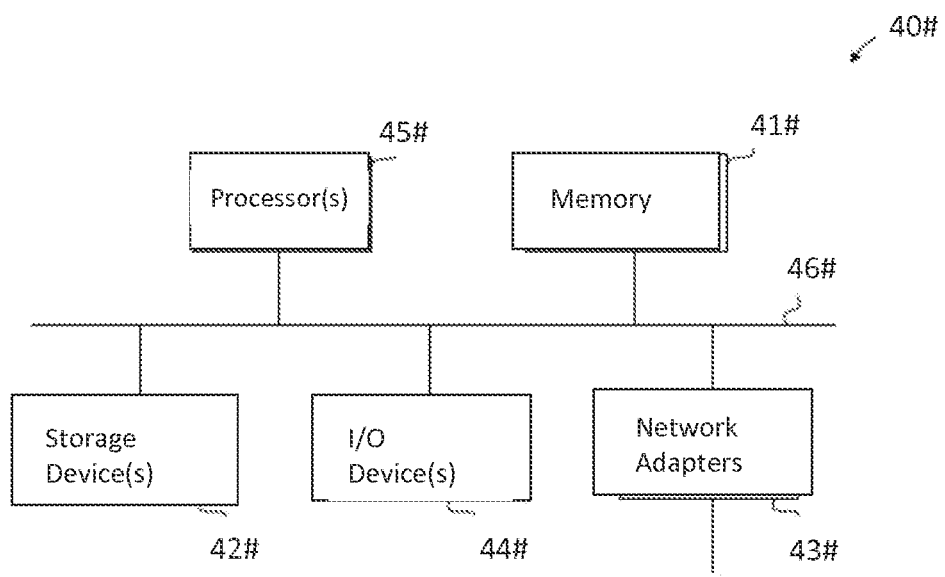
FIG. 6 is a block schematic diagram showing a machine in the example form of a computer system within which a set of instructions for causing the machine to perform one or more of the methodologies discussed herein may be executed.

FIG. 6 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 40 may include one or more central processing units ("processors") 45, memory 41, input/output devices 44, e.g. keyboard and pointing devices, touch devices, display devices, storage devices 42, e.g. disk drives, and network adapters 43, e.g. network interfaces, that are connected to an interconnect 46.

In FIG. 6, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 41 and storage devices 42 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 41 can be implemented as software and/or firmware to program one or more processors to carry out the actions described above. In some embodiments of the invention, such software or firmware may be initially provided to the processing system 40 by downloading it from a remote system through the computing system, e.g. via the network adapter 43.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented search method, comprising:
providing a processor executing instructions for:
receiving, from a user, a search request including any of search terms, and phrases;
using syntactic and semantic measures to determine a similarity metric between the any of search terms, and phrases received from the user and any of search terms, and phrases entered by others, wherein said syntactic measures analyze lexical aspects of said any of search terms, and phrases, and said semantic measures consider user activity;
using a clustering technique to cluster said any of search terms, and phrases received from the user within said any of search terms, and phrases entered by others in view of said similarity metric based on a pair-wise distance of said any of search terms, and phrases;
generating a weighted sub-graph of a website based on the similarity metric of said any of search terms, and phrases, said sub-graph assigning weights to Web journey choices based on Web journeys made by others who conduct searches with similar any of search terms, and phrases, wherein a graph is a linkage structure of nodes, wherein in a website, each page is a node in a website graph and an edge is a hyperlink from one page to another page, wherein at least one edge has weight, wherein if the graph has weighted edges, then the graph is a weighted graph, wherein a path is a sequence of nodes in the graph, wherein said weighted sub-graph comprises the weighted graph with sub-structure of a given website, and wherein said weights represent how many times all users visit from one page to another page after searching a particular any of search term, and phrase either internally or externally, on the website;
determining search results, wherein said determination includes determining the cluster associated the search request, and determining a highest weight of the weighted sub-graph weights associated with the any of search terms, and phrases of the cluster associated with the search request; and
generating a list of search results, the list of search results being based on an increased quantity of unique search terms or phrases associated with the cluster generated using the search request, and being ordered by the highest weight of the weighted sub-graph weights; and
displaying the list of search results representing optimized search results in response to the search request.

2. The method of claim 1, further comprising:
using said similarity metric to measure a similarity between two given any of search terms, and phrases (ST1, ST2) by combining their syntactic and semantic distances as follows:

Similarity(ST1, ST2)=$a$*(Syntactic_Distance(ST1, ST2))+$b$*(Semantic_Distance(ST1, ST2));

where "a" is a variable coefficient representing significance related to usage of syntactic distance between ST1 and ST2, and "b" is a variable coefficient representing significance related to usage of semantic distance between ST1 and ST2.

3. The method of claim 1, further comprising:
initially applying said syntactic measures to determine similarity between two given any of search terms, and phrases, expressed in terms of syntactic distance, as:

Similarity(ST1, ST2)=(Syntactic_Distance(ST1, ST2));

applying the clustering technique with a pair-wise distance between the any of search terms, and phrases; and
representing all any of search terms, and phrases in a single cluster with a single search term identifier.

4. The method of claim 3, further comprising:
measuring the similarity between two given any of the search terms, and phrases, expressed in terms of semantic distance, as:

Similarity(ST1, ST2)=Semantic_Distance((ST1, ST2)); and applying the clustering technique with the pair-wise distance between the any of search terms, and phrases to obtain clusters of the any of search terms, and phrases.

5. The method of claim 1, further comprising:
semantically representing each any of search terms, and phrases by top k nodes, paths, and edges in a particular weighted sub-graph.

6. The method of claim 5, further comprising:
using a Jacquard coefficient of the top k nodes, paths, and the edges to obtain similarity between any of search terms, and phrases.

7. The method of claim 6, further comprising:
calculating top k nodes for the any of search term, and phrase (ST1) as follows:
from a weighted sub-graph of any of search term, and phrase ST1, listing all the edges with their weights;
listing all nodes in the listed edges with weights;
sorting all nodes in said list in descending order of their weights; and
returning top k nodes from the above sorted list;
calculating top k edges for ST1 as follows:
from said weighted sub-graph of any of search term, and phrase ST1, listing all edges with their weights;
sorting all listed edges in descending order of their edges;
returning top k edges; and
calculating top k paths for the any of search term, and phrase ST1 as follows:
from said weighted sub-graph of any of search term, and phrase ST1, listing all edges with their weights;
in said weighted sub-graph, inversing all of the weights;
for each combination of nodes in said weighted sub-graph, calculating a shortest path;
sorting all calculated shortest paths in descending order of their total weight; and
returning the top k paths.

8. The method of claim 1, further comprising:
using Levenshtein distance to calculate the similarity between any of search terms, and phrases.

9. The method of claim 1, further comprising:
pre-processing said any of search terms, and phrases in a two-step process in which any of search term, and phrase normalization is followed by finger-keying.

10. The method of claim 9, wherein said any of search term, and phrase normalization further comprises:
lower casing the any of search terms and phrases; and
removing all punctuation marks except spaces.

11. A computer-implemented search method, comprising:
providing a processor executing instructions for:
receiving, from a user, a search request including any of the search terms, and phrases;
pre-processing the any of search terms and phrases, in a two-step process in which any of search terms, and phrases normalization is followed by finger-keying, wherein said finger-keying comprises:
taking each of the any of search terms, and phrases, and splitting it by space to obtain search words;
lemmatizing each of the any of search terms, and phrases for each search word to obtain a list of lemmatized search words;
sorting the above list in alphabetic order;
clubbing the search words separated by space to obtain finger key form; and
taking a Levenshtein distance between finger-keys of the any of search terms, and phrases to get a pair-wise distance between the any of search terms, and phrases;
using syntactic measures, and semantic measures to determine a similarity metric between the any of search terms, and phrases, received from the user and the any of search terms, and phrases entered by others, wherein said syntactic measures analyze lexical aspects of the any of search terms, and phrases, and said semantic measures consider user activity;
using a clustering technique to cluster said any of search terms, and phrases received from the user within the any of search terms, and phrases entered by others in view of the Levenshtein distance and the similarity metric based on the pair-wise distance of said any of search terms, and phrases;
determining a search result, wherein said determination includes determining the cluster associated the search request;
generating a list of search results, the list of search results being based on an increased quantity of unique search terms or phrases associated with the cluster generated using the search request, and representing an ordered list of search results in response to the search request; and
displaying the search results representing optimized search results in response to the search request.

12. A search apparatus, comprising:
a processor executing instructions for:
receiving, from a user, a search request including any of search terms, and phrases;
using syntactic and semantic measures to determine a similarity metric between the any of search terms, and phrases received from the user and the any of search terms, and phrases entered by others, wherein said syntactic measures analyze lexical aspects of said any of search terms, and phrases, and said semantic measures consider user activity;
using a clustering technique to cluster said any of search terms, and phrases received from the user within the any of search terms, and phrases entered by others in view of said similarity metric based on a pair-wise distance of said any of search terms, and phrases;
generating a weighted sub-graph of a website based on the similarity of said any of search terms, and phrases, said sub-graph assigning weights to Web journey choices based on Web journeys made by others who conduct searches with similar any of search terms, and phrases, wherein a graph is a linkage structure of nodes, wherein in a website, each page is a node in a website graph and an edge is a hyperlink from one page to another page, wherein at least one edge has weight, wherein if the graph has weighted edges, then the graph is a weighted graph, wherein a path is a sequence of nodes in the graph, wherein said weighted sub-graph comprises the weighted graph with sub-structure of a given website, wherein said weights represent how many times all users visit from one page to another page after searching a particular any of search terms, and phrases either internally or externally, on the website;
determining search results, wherein said determination includes determining the cluster associated the search request, and determining a highest weight of the weighted sub-graph weights associated with the any of search terms, and phrases of the cluster associated with the search request;
generating a list of search results, the list of search results being based on an increased quantity of unique search terms or phrases associated with the cluster generated using the search request, and being ordered by the highest weight of the weighted sub-graph weights; and
displaying the list of search results representing optimized search results in response to the search request.

13. A search apparatus, comprising:
a processor executing instructions for:
receiving, from a user, a search request including any of search terms, and phrases;
pre-processing said any of search terms and phrases in a two-step process in which any of search term and phrase normalization is followed by finger-keying, wherein said finger-keying comprises:
taking each any of search terms and phrases, and splitting it by space to obtain search words;
lemmatizing each of any of search terms, and phrase for each search word to obtain a list of lemmatized search words;
sorting the above list in alphabetic order;
clubbing the search words separated by space to obtain finger key form; and
taking a Levenshtein distance between finger-keys of any of the search terms and phrases to get a pair-wise distance between the any of the search terms and phrases;
using syntactic measures, and semantic measures to determine a similarity metric between the any of search terms, and phrases received from the user and the any of the search terms, and phrases entered by others, wherein said syntactic measures analyze lexical aspects of said search terms, and phrases, and said semantic measures consider user activity;
using a clustering technique to cluster the any of search terms, and phrases received from the user within the any of search terms, and phrases entered by others in view of the Levenshtein distance and the similarity metric based on the pair-wise distance of said any of search terms, and phrases;
determining a search result, wherein said determination includes determining the cluster associated the search request;
generating a list of search results, the list of search results being based on an increased quantity of unique search terms or phrases associated with the cluster generated using the search request, and results representing an ordered list of search results in response to the search request; and
displaying the search results representing optimized search results in response to the search request.

14. The search apparatus of claim 12, further comprising:
semantically representing each of said any of search term, and phrases by top k nodes, paths, and edges in a particular weighted sub-graph.

15. The search apparatus of claim 14, further comprising:
using a Jacquard coefficient of the top k nodes, paths, and the edges to obtain similarity between any of search terms and phrases.

16. The search apparatus of claim 15 further comprising:
calculating top k nodes for the search term (ST1) as follows:
from a weighted sub-graph of any of search term, and phrase ST1, listing all the edges with their weights;
listing all nodes in the above listed edges with weights;
sorting all nodes in said list in descending order of their weights; and
returning the top k nodes from the above sorted list;
calculating top k edges for ST1 as follows:
from said weighted sub-graph of any of search term, and phrase ST1, listing all edges with their weights;
sorting all listed edges in descending order of their edges;
returning the top k edges; and
calculating top k paths for the any of search term, and phrase ST1 as follows:
from said weighted sub-graph of any of search term, and phrase ST1, listing all edges with their weights;
in said weighted sub-graph, inversing all of the weights;
for each combination of nodes in said weighted sub-graph, calculating a shortest path;
sorting all calculated shortest paths in descending order of their total weight; and
returning the top k paths.

17. The method of claim 11, wherein said any of search term and phrase normalization further comprises:
lower casing the any of search term and phrase; and
removing all punctuation marks except spaces.

18. The search apparatus of claim 12, further comprising:
pre-processing said search terms in a two-step process in which any of search terms, and phrases normalization is followed by finger-keying; and
wherein said search term normalization further comprises lower casing the any of search terms and phase and removing all punctuation marks except spaces.

19. The search apparatus of claim 13, wherein said any of search terms, and phrases normalization further comprises:
lower casing the any of search terms and phrases; and
removing all punctuation marks except spaces.

* * * * *